United States Patent [19]
Uken et al.

[11] Patent Number: 4,883,431
[45] Date of Patent: Nov. 28, 1989

[54] GEL-FILLED CAP MEMBER

[75] Inventors: David Uken, Fremont, Calif.; R. Grant Truesdale, Jr., Cary; Daniel L. Swan, Raleigh, both of N.C.

[73] Assignee: Raychem Corporation, Menlo Park, Calif.

[21] Appl. No.: 912,309

[22] Filed: Sep. 26, 1986

[51] Int. Cl.$^4$ .............................................. H01R 13/52
[52] U.S. Cl. .................................. 439/521; 174/76; 174/138 F
[58] Field of Search .................. 439/204, 521, 522; 174/76, 138 F, 77 R, 177 S

[56] References Cited

U.S. PATENT DOCUMENTS

| | | | |
|---|---|---|---|
| 2,636,065 | 4/1953 | Fiske | 174/138 F |
| 2,715,654 | 8/1955 | Lucas | 174/77 S |
| 2,825,880 | 3/1958 | Wechsler | 439/892 |
| 3,112,148 | 11/1963 | Wochner | 174/138 F |
| 3,504,099 | 3/1970 | Beinhaur | 174/76 |
| 3,597,528 | 8/1971 | Penfield | 174/76 |
| 4,186,986 | 2/1980 | Shoemaker | 439/204 |
| 4,449,015 | 5/1984 | Hotchkiss et al. | 174/138 F |
| 4,473,265 | 9/1984 | Dellinger | 439/521 |
| 4,600,261 | 7/1986 | Debbaut | 439/521 |
| 4,634,207 | 1/1987 | Debbaut | 439/521 |
| 4,674,820 | 6/1987 | Foster et al. | 439/522 |

OTHER PUBLICATIONS

Raychem Corporation Brochure: TermSeal Terminal Lug Cap, printed Nov. 1985, (11/85).
Raychem System Practice and Installation Instructions Section RYCH-62-301, Issue 1, dated Jun. 1985, and printed Oct. 1985, (10/85).
Raychem System Practice and Installation Instructions, dated Dec. 1987, and printed Jan. 1988, (1/88).

*Primary Examiner*—Neil Abrams
*Attorney, Agent, or Firm*—Bernard J. Lyons; Herbert G. Burkard

[57] ABSTRACT

A gel-filled cap member having a retaining nut member therein for receiving a threaded contact member and a notch, at the open end of the cap member, for at least partially receiving a wire to be connected to the threaded contact member. The cap member may also have a portion at the open end of the cap member which is defined by reinforced wall having an increased cross-sectional area. Further, the cap member may have a plunger portion at the closed end of the cap member for applying increased pressure to the gel.

8 Claims, 3 Drawing Sheets

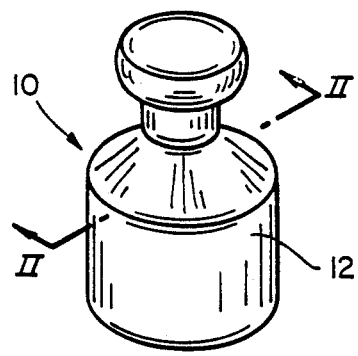
FIG_1
(PRIOR ART)
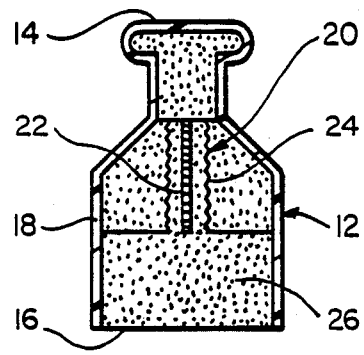
FIG_2
(PRIOR ART)
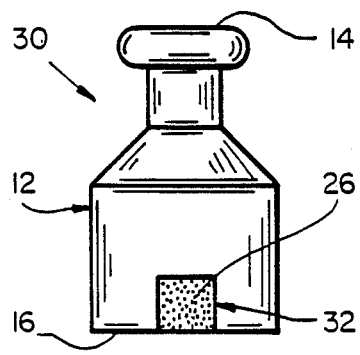
FIG_3
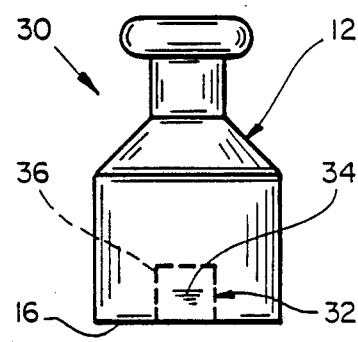
FIG_4

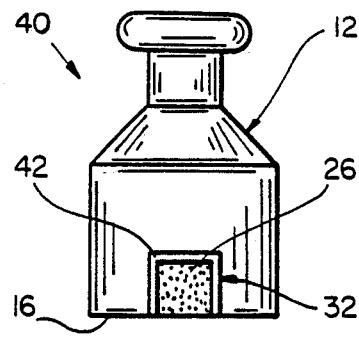
FIG_5
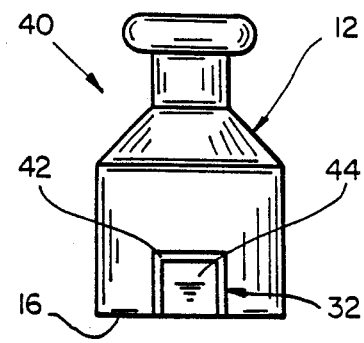
FIG_6
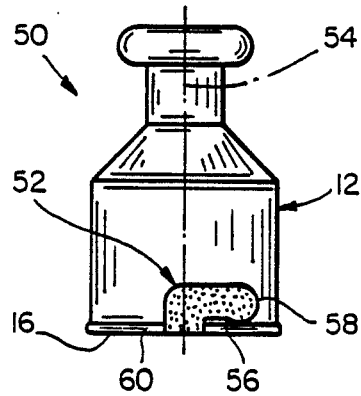
FIG_7
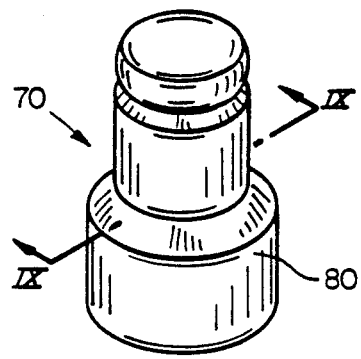
FIG_8

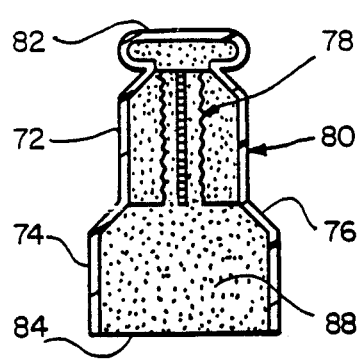
FIG_9
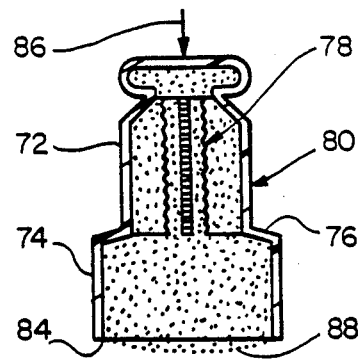
FIG_9A
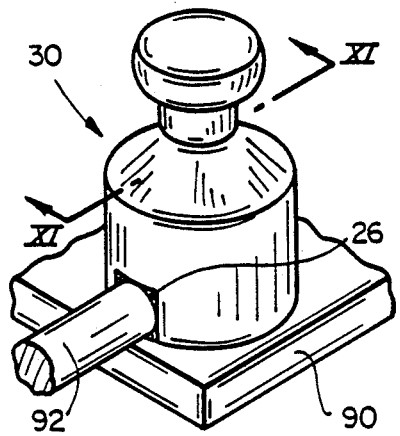
FIG_10
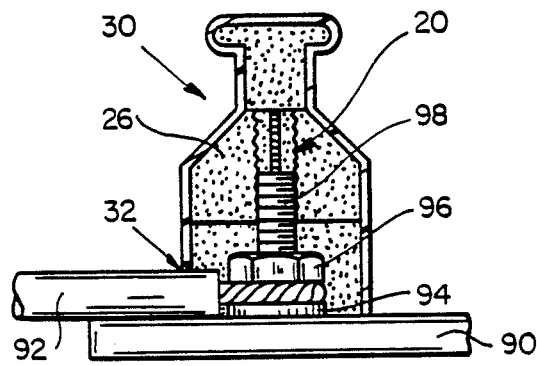
FIG_11

GEL-FILLED CAP MEMBER

BACKGROUND OF THE INVENTION

This invention relates to the field of gel-filled caps and in particular to those gel-filled caps used in connection with the terminating and sealing of telecommunication wires.

In the termination of electrically conductive wires, particularly telecommunication wires, to a substrate, it is often necessary to individually protect each termination, as opposed to the entire substrate, from the elements, including moisture, insects and vermin. Protective gel-filled covers have been proposed in Debbaut U.S. patent application Ser. No. 434,011, filed Oct. 12, 1982, now U.S. Pat. No. 4,600,261; serial number 504,000, filed June 13, 1983, now U.S. Pat. No. 4,634,207; serial number 507,433, filed June 23, 1983, now abandoned; serial number 756,559, filed July 17, 1985, now abandoned; and serial number 892,519, filed July 31, 1986, the disclosures of which are incorporated by reference herein.

While the above Debbaut protective covers perform well in practice, it has been found that under certain conditions there is imperfect sealing (and therefore imperfect protection) of the termination. The imperfect sealing primarily results from the fact that when the protective cover is placed upon the terminal, especially with certain terminal configurations and wire types, the protective cover may not seal well around the wire which is to be terminated. Accordingly, a leak path around the wire for moisture ingress may occur. This may be the case even if the protective cover is filled with a suitable gel or other encapsulant.

In practice, the workman has partially solved the problem by manually cutting a notch in the end of the protection cover. When the notch receives the wire, the sealing of the protective cover is improved.

However, this solution is unsatisfactory for at least two reasons. The first is that the notch may not always be accurately cut so that sealing is not always optimized. The second is that manually cutting each protective cover is an extremely onerous task due to the fact that millions of these protective covers are installed every year.

Accordingly, the need has arisen for an improved protective cover wherein sealing may be efficiently and effectively enhanced.

Therefore, it is an object of the invention to provide such a cover.

This and other objects of the invention will become more apparent after referring to the following description considered in conjunction with the accompanying drawings.

BRIEF SUMMARY OF THE INVENTION

One aspect of the invention relates to a gel-filled cap member having a retaining nut member therein for receiving a threaded contact member. The gel-filled cap member also has, at the open end of the cap member, a notch for at least partially receiving a wire to be connected to the threaded contact member. The notch is at least partially formed during the manufacture of the cap member.

Another aspect of the invention relates to a gel-filled cap member also having a retaining nut member for receiving a threaded contact member but in this case the cap member has a portion at the open end of the cap member which is defined by a reinforced wall having an increased cross-sectional area.

A further aspect of the invention relates to a gel-filled cap member also having a retaining nut member for receiving a threaded contact member but in this case the cap member has a plunger portion at the closed end of the cap member wherein the wall immediately surrounding the plunger portion is flexible, so that the plunger portion when activated in use causes a decrease in the volume of the cap member. This also causes pressure to be applied to the gel.

BRIEF DESCRIPTION OF THE DRAWINGS

FIG. 1 is a perspective view of a prior art gel-filled cap member.

FIG. 2 is a sectional view of the cap member of FIG. 1 along the lines II—II.

FIGS. 3 to 7 are side views of various embodiments of the gel-filled cap member according to the invention.

FIG. 8 is a perspective view of another embodiment of the gel-filled cap member according to the invention.

FIGS. 9 and 9A are sectional views of the gel-filled cap member shown in FIG. 8 along the lines IX—IX.

FIG. 10 is a perspective view of one embodiment of the gel-filled cap member in use.

FIG. 11 is a partial sectional view of the gel-filled cap member shown in FIG. 10 along the lines XI—XI.

DETAILED DESCRIPTION OF THE INVENTION

Disclosed according to one aspect of the invention is a cap member comprising a hollow body having a closed end, an open end and a wall; a retaining nut member for receiving a threaded contact member positioned within the body; a gel substantially filling the body, the gel having a cone penetration value from approximately 100 to 350 ($10^{-1}$ mm) and an ultimate elongation of at least approximately 200%. The cap member further comprises at the open end of the body a notch for at least partially receiving a wire to be connected to the threaded contact member wherein the notch is at least partially formed during the manufacture of the cap member.

According to the invention there is also disclosed a cap member comprising a hollow body having a closed end, an open end and a wall; a retaining nut member for receiving a threaded contact member portioned within the body; and a gel substantially filling the body, the gel having a cone penetration value from approximately 100 to 350 ($10^{-1}$ mm) and an ultimate elongation of at least approximately 200%. The cap member further comprises a portion of the body at the open end thereof being defined by a reinforced wall having an increased cross sectional area.

There is further disclosed according to the invention a cap member comprising a hollow body having a closed end, an open end and a wall; a retaining nut member for receiving a threaded contact member positioned within the body; and a gel substantially filling the body, the gel having a cone penetration value from approximately 100 to 350 ($10^{-1}$ mm) and an ultimate elongation of at least approximately 200%. The cap member further comprises a plunger portion at the closed end of the body wherein the wall immediately surrounding the plunger portion is flexible. The plunger portion when activated in use causes a decrease in the volume of the body.

Referring to the Figures in more detail and particularly referring to FIGS. 1 and 2 there is shown a prior art gel-filled cap member 10. As better seen in FIG. 2 the cap member consists of a hollow body 12 having a closed end 14, an open end 16 and a wall 18. There is also a retaining nut member 20 for receiving a threaded contact member (not shown). This retaining nut member 20 is positioned within the body 12 between the closed end 14 and the open end 16. As can be seen the retaining nut member 20 is actually made up of projections or ribs 22 which extend from the wall 18 of the body and at the end of these projections 22 there are serrations or ridges 24 which serve to engage the threads of a threaded contact member when it is inserted within the retaining nut member 20. The cap member also contains a gel 26 which substantially fills the body 12. The retaining nut member 20, upon engaging the threaded contact member, serves to maintain the gel under compression, thereby aiding in the encapsulation and sealing of the termination.

The gel is preferably any one of the types disclosed in the Debbaut applications noted in the Background of the Invention. Specifically, the gel is to have a cone penetration value from approximately 100 to 350 ($10^{-1}$ mm), preferably between 240 and 330, more preferably between 250 and 280 and most preferably between 250 and 270; an ultimate elongation of at least approximately 200%; and a cohesive strength greater than an adhesive strength of an exposed surface of the gel to itself or a similar gel. The stated parameters for the cone penetration and elongation are provided in accordance with the American National Standard Designation ASTM D217 and ASTM D738, respectively. A viscous flow of the gel is such that it tends to conform around an outer surface of an object suppressed therein, and exerting pressure on the gel increases the degree and quality with which the gel conforms to the object.

The Debbaut applications also substantially disclose the gel-filled cap member shown in FIGS. 1 and 2. This prior art gel-filled cap member is commercially available from Raychem Corporation, the assignee of the instant application.

Referring now to FIG. 3 there is shown a cap member 30 according to the invention. The cap member 30 shown in FIG. 3 is similar to the cap member 10 shown in FIGS. 1 and 2 in that it comprises a hollow body having a closed end, an open end and a wall; a retaining nut member; and a gel substantially filling the body. However, the cap member 30 according to the invention further comprises a notch 32 in the body 12 at the open end 16 of the body. This notch 32, as will become more apparent hereafter, is for at least partially receiving a wire which is to be connected to a threaded contact member. While it is within the scope of the invention for the notch 32 to be somewhat smaller than the diameter of the wire to be connected, the objects of the invention will be better achieved when the notch 32 is at least equal in size to the diameter of the wire to be connected. It has been found in practice that due to the interference between the wire which is to be connected to the threaded contact member and the body 12 of the cap member 30 that the cap member 30 may not always lay flat upon a terminal block. Accordingly, there may be incomplete sealing of the gel 26 around the wire. Accordingly, with the notch as disclosed in FIG. 3, the cap is able to be placed with respect to the wire so that the cap member 30 may now lay flat, or nearly flat, upon the terminal block.

It should be understood that a gel substantially filling the body is to include complete filling of the body as well as partial filling of the body, so long as effective sealing of the termination is accomplished.

The notch 32 as shown in FIG. 3 is most preferably at least partially formed during the manufacture of the cap member. For example, the notch may be molded into the body during the formation of the cap body 12.

Alternatively, the notch 32 may be formed by at least one weakened wall section 34 in the body 12. As shown in FIG. 4 this weakened section is bounded by perforations 36. In use, the weakened wall section 34 may be separated from the remainder of the body 12 by tearing along the perforations 36. The perforations 36 can be configured so that the weakened wall section 34 may be torn off by hand or with a suitable tool such as a pliers or snips. Of course, this weakened wall section 34 may also be formed by an area in the body having a reduced cross-sectional thickness. While this particular embodiment is not shown in the Figures it is nevertheless contemplated within the scope of the invention.

As shown in FIG. 5 the notch 32 in the body 12 of the cap member 40 may additionally and most preferably be defined by a reinforced wall 42. This reinforced wall 42 has an increased cross-sectional area. That is, the wall thickness at the reinforced wall 42 is thicker than the wall thickness away from this reinforced wall. This reinforced wall serves to strengthen the notch so that there will not be any inadvertent tearing of the body due to the notch. More importantly, the reinforced wall helps to contain the gel in compression (which aids in sealing) and prevents the gel from pushing the notch open. It may be desirable to mold or otherwise form the body with the reinforced wall 42 and notch 32 already in it, as shown in FIG. 5. Alternatively, the body can be formed with the reinforced wall 42 but with the portion 44 defined by the reinforced wall 42 not removed, as shown in FIG. 6. Thus, the embodiment shown in FIG. 6 is a cap member 40 having a portion 44 which is defined by a reinforced wall 42, and no notch, as yet. The advantage to this latter embodiment is that if a notch should not be needed, then the wall portion 44 defined by the reinforced wall 42 need not be removed. However, if a notch should be needed in use, then the wall portion 44 defined by the reinforced wall 42 may be removed by cutting with a suitable tool. In this case the notch 32 would be defined by the reinforced wall 42, as shown in FIG. 5. Thus, one cap member may be stocked to serve two different end uses.

Referring now to FIG. 7 there is shown a further embodiment of a cap member 50 wherein the notch 52 is curved. That is, the notch 52 begins in a direction generally parallel to the longitudinal axis 54 of the body 12 and then curves around and ends in a direction generally perpendicular to this longitudinal axis 54. The advantage of this particular curved notch is that the notch 52 causes the wire that is to be connected to be raised from the surface of the terminal block. This allows the gel to more easily and completely encapsulate the wire and termination. Any possible leak path for the ingress of water is therefore eliminated. In use the cap member 50 would be placed over the wire and then twisted until the wire rests entirely within the curved notch 52. With particularly stiff wires, it may be necessary for the workman to guide the wire into the curved notch 52. If desired the curved notch 52 may also have a detent portion 56 proximate to the end 58 of the notch 52 so as to more firmly hold the wire in the notch 52. It may be further desirable to enhance the skirt 60 of the cap member as shown in FIG. 7. This enhancement appears as a thickened wall section around the circumference of the open end 16 of the body 12 and acts to strengthen the open end 16 of the cap member 50 so that it is more able to lift the wire without the notch 52 collapsing. While this enhanced skirt 60 is shown only in FIG. 7, it should be understood that it may be desirable to use an enhanced skirt in the embodiments of the invention previously discussed as well as embodiments of the invention to be discussed hereafter.

FIGS. 8, 9 and 9A disclose a further embodiment of the invention. FIGS. 9 and 9A are sectional views of the cap member 70 shown in FIG. 8. Comparing FIGS. 9 and 9A with FIG. 2 discussed previously it can be seen that the upper portion 72 of the cap member 70 has been substantially changed. In this regard the retaining nut member 78 has been entirely separated from the bottom portion 74 of the body 80 by flexible wall portion 76. The portion 72 of the body 80 immediately above this flexible wall 76 forms a plunger portion which encompasses the closed end 82 of the body 80. The plunger portion 72 when activated by a downward force, as schematically illustrated by arrow 86 shown in FIG. 9A, causes a decrease in the volume of the body 80. This decrease in volume of the body results in the movement of the gel 88 out of the cap member 70. In use, once the cap member 70 is placed upon the threaded contact member the plunger portion 72 may be pushed down so as to apply or further apply (as the case may be) pressure to the gel 88. The plunger portion 72 is held in its down position by the engagement of the retaining nut member 78 and the threaded contact member. Upon the pressing down of the plunger portion so that increased pressure is exerted upon the gel, the gel is squeezed out of the cap member and around the wire which is to be connected. This causes a more efficient encapsulation of the wire member and thus greater sealing. While cap member 70 as shown in FIGS. 8, 9 and 9A does not have a notch, it is contemplated within the scope of the invention that cap member 70 may be used with a notch as disclosed in any of the previous embodiments of the invention. A particularly preferred combination is cap 70 shown in FIGS. 8, 9 and 9A and curved notch 52 shown in Figure 7.

An embodiment of the cap member according to the invention is shown in use in FIGS. 10 and 11. For purposes of illustration and not of limitation, the cap member 30 from FIG. 3 is being used. As can be seen the cap member 30 is placed upon a terminal block 90 and over a wire 92 to be terminated. Wire 92 in this case is an aerial drop wire which is relatively thick and stiff. The wire 92 is stripped at the end and rests upon a stand-off 94 which raises the stripped wire slightly from the surface of the terminal block 90. Over the wire there is placed a threaded nut 96 which is engaged with the threaded contact member 98, both of which serve to hold the wire 92 firmly in place against the stand-off 94. The threaded contact member 98 is, in turn, engaged with the retaining nut member 20. Due to the thickness of the wire 92, the prior art cap member may not lay flat on the terminal block 90 when it is placed over the wire 92 and the threaded contact member 98. However, the cap member 30 according to the invention has a notch 32 which is situated over and around the wire 92, thereby allowing the cap member 30 to lay flat with respect to the terminal block 90. As can be seen in FIG. 11 the gel 26 has encapsulated the wire 92 so as to eliminate a potential leak path.

While FIGS. 10 and 11 illustrate only one cap member and one termination, it should be understood that there will usually be a plurality of such caps and such terminations. However, the teaching of the invention is equally applicable to both situations.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

We claim:

1. A cap member for a threaded contact member, the cap member comprising:
   (A) a hollow body having a closed end, an open end and a wall;
   (B) a retaining nut member positioned within said body for engaging the threads of the contact member;
   (C) a gel substantially filling said body, said gel having a cone penetration value from approximately 100 to 350 ($10^{-1}$ mm) and an ultimate elongation of at least approximately 200%;
   said body at the open end having a notch for receiving a wire connected to the threaded contact member; the notch having a first axially disposed portion which is positioned generally parallel to the longitudinal axis of the cap member and a second circumferentially disposed portion which is (a) positioned generally perpendicular to the longitudinal axis of the cap member and (b) as adapted to lift and hold the wire away from the open end when the cap member is rotated about the longitudinal axis.

2. The cap member of claim 1 wherein said notch is formed by being molded into said body.

3. The cap member of claim 1 further comprising a plunger portion at the closed end of said body wherein the wall immediately surrounding said plunger portion is flexible, said plunger portion when activated in use causing a decrease in the volume of said body.

4. The cap member of claim 1 wherein the gel has a cone penetration value between 240 and 280 ($10^{-1}$mm).

5. The cap member of claim 4 wherein the gel has a cone penetration value between 250 and 270 ($10^{-1}$mm).

6. A cap member for a threaded contact member comprising:
   a hollow body having a closed end, an open end and a wall;
   a retaining nut member positioned within said body for engaging the threads of the contact member;
   a gel substantially filling said body, said gel having a cone penetration value from approximately 100 to 350 ($10^{-1}$ mm) and an ultimate elongation of at least approximately 200%; said body at the open end having a notch area which contains a notch for receiving a wire connected to the threaded contact member; and
   a reinforced wall adjacent to and surrounding said notch area except for a side of the notch area at the open end of the body wherein the reinforced wall is thicker than the body area outside the reinforced wall and is thicker than any body area in the notched area inside the reinforced wall before the notch is formed and has sufficient thickness to prevent tearing of the body area outside the reinforced wall when the notch is formed or when the notch receives the wire;

said body at the closed end comprising a plunger portion wherein the wall immediately surrounding said plunger portion is flexible, said plunger portion when activated in use causing a decrease in the volume of said body.

7. The cap member of claim 6 wherein the gel has a cone penetration value between 240 and 280 ($10^{-1}$mm).

8. The cap member of claim 7 wherein the gel has a cone penetration value between 250 and 270 ($10^{-1}$mm).

* * * * *